Figures 1, 2:
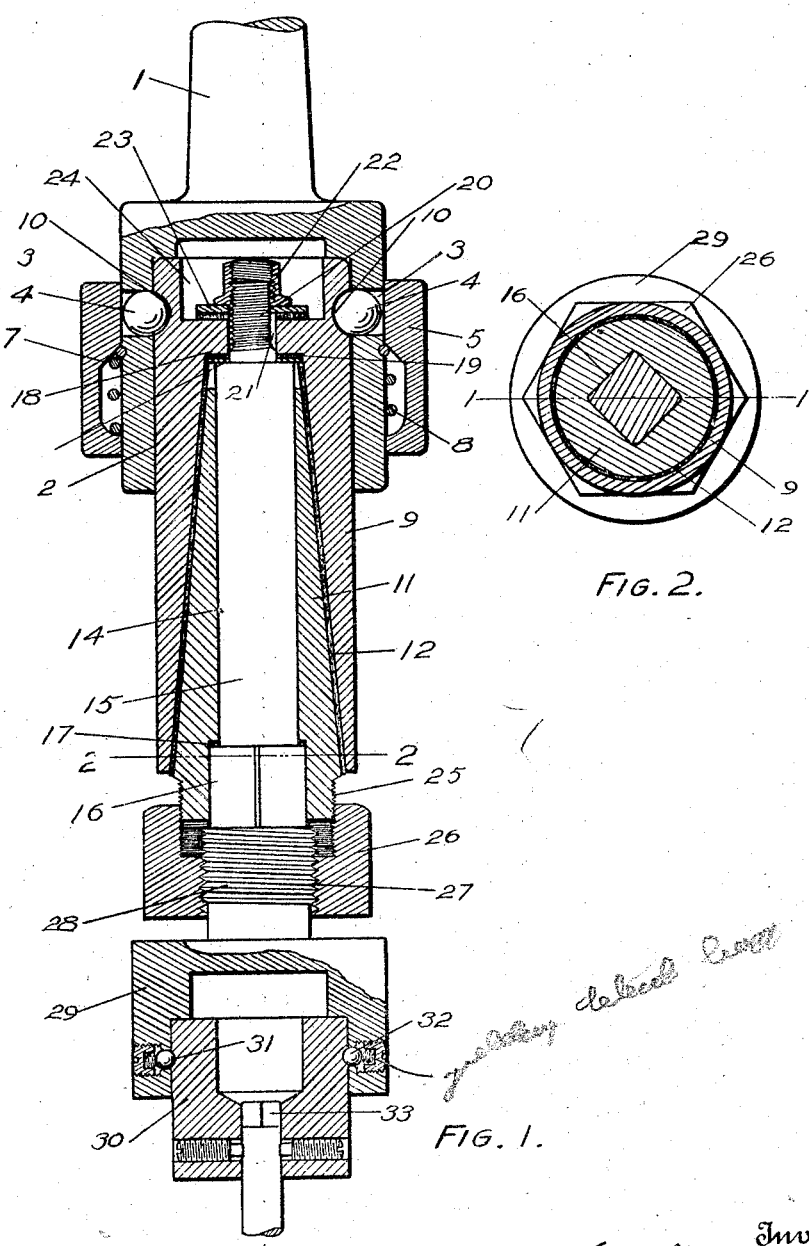

Aug. 25, 1925.  F. A. VEITH  1,550,936

SLIP DRIVING TOOL

Filed July 1, 1924

Inventor
Frank A. Veith
By
Attorney

Patented Aug. 25, 1925.

1,550,936

UNITED STATES PATENT OFFICE.

FRANK A. VEITH, OF ERIE, PENNSYLVANIA, ASSIGNOR TO TITAN TOOL COMPANY, OF ERIE, PENNSYLVANIA, A CORPORATION OF PENNSYLVANIA.

SLIP DRIVING TOOL.

Application filed July 1, 1924. Serial No. 723,519.

*To all whom it may concern:*

Be it known that I, FRANK A. VEITH, a citizen of the United States, residing at Erie, in the county of Erie and State of Pennsylvania, have invented new and useful Improvements in Slip Driving Tools, of which the following is a specification.

This invention is designed to provide a slip driving tool which may be very nicely adjusted without removing the tool from the work and which does not have a tendency to "grab" common to such tools. Further the tool is so formed that the adjustment may be made of the driving engagement without varying the axial adjustment of the driven tool. This is of considerable importance where the tool has been nicely set for a self-opening die or collapsing tap, or any other kinds of work where a nice adjustment of the axial position of the tool is necessary. Other features and details of the invention will appear from the specification and claims.

The invention is illustrated in the accompanying drawings as follows:—

Fig. 1 shows a central section on the line 1—1 in Fig. 2.

Fig. 2 a section on the line 2—2 in Fig. 1.

1 marks a tapered collet shank. This has a socket 2, the ball opening 3, the locking balls 4, and the ball actuating sleeve 5 having the ball actuating clamp 7 and the spring 8 for yieldingly holding the sleeve in locking position. This structure is similar to that shown in my application, Serial Number 441,233, filed Jan. 31, 1921. The driving tool has a conical sleeve 9. This has the ball sockets 10 so that when slipped into the socket 2 the balls lock the cone sleeve in driving engagement with the shank. A cone spindle 11 is arranged within the cone sleeve with a friction material 12 between the surfaces of the cones. The cone spindle has an opening 14 through it in which the driving rod 15 is arranged. The driving rod has a squared end 16 which is slidingly mounted in a socket 17 in the end of the spindle 11.

The sleeve 9 has a shoulder 18 at its upper end and the rod 15 has a shoulder engaging a shoulder 18, there being preferably a friction or fibre washer 19 between the shoulders. A screw-threaded extension 20 extends through an opening 21 in the sleeve and a nut 22 is secured on the end of the screw. A washer 23 is arranged between the nut 22 and the end of the sleeve. The nut and projections are arranged in a socket 24 so as to permit the sleeve to enter the ordinary collet.

The spindle has a screw thread 25 arranged at its lower end and a nut 26 is threaded on to this screw. The nut has a second screw 27 which operates on a screw 28 on the rod 15. The pitch of the screws 25 and 28 differ both extending preferably in the same direction. Consequently by turning the nut the cone pin is moved axially relatively to the rod and by reason of these varying pitch screws this movement can be very nicely adjusted. Further the engagement of the screws in both directions locks the cone pin against axial movement, thus obviating a tendency to "grab". Further this double engagement of the screw forces a release movement of the cone pin when the screw is reversed.

A tool holder 29 is arranged in the lower end of the rod 15. As shown it has a tool chuck 30 which has the ball detents 31 adapted to engage the yielding balls 32. A tool, such as a tap shank, 33 is shown.

What I claim as new is:—

1. In a slip driving device, the combination of two conical members, one within the other; a drive rod locked axially with one member and rotatively with the other member; and means adjusting the member locked rotatively axially on the rod to adjust the members relatively to each other.

2. In a slip driving device, the combination of two conical members, one within the other; a drive rod locked axially with one member and rotatively with the other member; and means adjusting the member locked rotatively axially on the rod to adjust the members relatively to each other comprising a nut between the member locked rotatively with the rod and the rod.

3. In a slip driving device, the combination of two conical members, one within the other; a drive rod locked axially with one member and rotatively with the other member; and means adjusting the member locked rotatively axially on the rod to adjust the members relatively to each other comprising a nut between the member locked rotatively with the rod and the rod, said nut being connected with the rod and member with screw threads of different pitches.

4. In a slip driving device, the combination of a cone sleeve; a cone pin within the sleeve; a driving rod slidingly mounted in the cone but locked rotatively therein; means for locking the rod axially with the cone sleeve and cone pin; and adjusting means between the cone pin and the rod.

5. In a slip driving device, the combination of a cone sleeve; a cone pin within the sleeve; a driving rod slidingly mounted in the cone but locked rotatively therein; means for locking the rod axially with the cone sleeve and cone pin; and adjusting means between the cone pin and the rod comprising a nut having a screw connection with the pin and a screw connection with the rod, said screw connections having screws of different pitches.

6. In a slip driving device, the combination of a cone sleeve having a shouldered end; a cone pin within the sleeve; a drive rod extending through the cone pin having a shouldered engagement with the shouldered end of the sleeve; means opposite the shoulder for locking the rod in engagement with the shoulder on the sleeve; means for locking the rod rotatively with the pin; and means for adjusting the pin on the rod.

7. In a slip driving device, the combination of a cone sleeve having a shouldered end; a cone pin within the sleeve; a drive rod extending through the cone pin having a shouldered engagement with the shouldered end of the sleeve; means opposite the shoulder for locking the rod in engagement with the shoulder on the sleeve; means for locking the rod rotatively with the pin; and means for adjusting the pin on the rod comprising a nut having a screw-threaded connection with the pin and a screw-threaded connection with the rod.

In testimony whereof I have hereunto set my hand.

FRANK A. VEITH.